United States Patent
Chen et al.

(10) Patent No.: US 6,605,653 B1
(45) Date of Patent: *Aug. 12, 2003

(54) INK JET PRINTING METHOD

(75) Inventors: Huijuan Chen, Webster, NY (US); Leslie Shuttleworth, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 09/643,532

(22) Filed: Aug. 22, 2000

(51) Int. Cl.$^7$ .......................... C09D 11/10; C08K 5/23; C08K 5/3445; C08K 5/3472; B41J 2/01
(52) U.S. Cl. .......................... 523/160; 524/91; 524/92; 524/94; 524/106; 524/190; 347/100
(58) Field of Search ................. 523/160, 161; 106/31.49, 31.5, 31.51, 31.48; 524/87, 91, 94, 104, 106, 190, 92; 347/100

(56) References Cited

U.S. PATENT DOCUMENTS

| | | | | |
|---|---|---|---|---|
| 3,679,656 A | * | 7/1972 | Iizuka et al. ................. | 534/607 |
| 4,111,929 A | * | 9/1978 | Fawkes ....................... | 534/610 |
| 4,218,369 A | * | 8/1980 | Brouard et al. ............. | 534/611 |
| 4,252,716 A | * | 2/1981 | Kuhlthau .................... | 534/610 |
| 4,460,637 A | * | 7/1984 | Miyamoto et al. .......... | 428/212 |
| 4,925,926 A | * | 5/1990 | Ronco et al. ................ | 534/589 |
| 5,264,560 A | * | 11/1993 | Hansen et al. .............. | 534/589 |
| 5,560,996 A | | 10/1996 | Ito et al. | |
| 5,723,211 A | * | 3/1998 | Romano et al. ............ | 428/328 |
| 5,969,033 A | * | 10/1999 | Pearlstine ................... | 524/502 |
| 6,025,412 A | * | 2/2000 | Sacripante et al. ......... | 523/161 |
| 6,033,049 A | * | 3/2000 | Fukuda ....................... | 347/20 |
| 6,231,652 B1 | * | 5/2001 | Koyano et al. ............ | 106/31.27 |
| 6,235,096 B1 | * | 5/2001 | Meyrick et al. ......... | 106/31.43 |
| 6,419,354 B1 | * | 7/2002 | Weber et al. ............... | 347/101 |

FOREIGN PATENT DOCUMENTS

| | | |
|---|---|---|
| EP | 0 970 819 A2 | 1/2000 |
| EP | 1 010 539 A1 | 6/2000 |

* cited by examiner

*Primary Examiner*—Callie Shosho
(74) *Attorney, Agent, or Firm*—Harold E. Cole

(57) ABSTRACT

An ink jet printing method, comprising the steps of:

A) providing an ink jet printer that is responsive to digital data signals;

B) loading said printer with ink-receptive elements comprising a support having thereon a porous ink-receptive layer;

C) loading said printer with an ink jet ink composition comprising water, a humectant, and a water-dispersible polymeric latex having contained therein a delocalized cationic azo dye derived from the quaternization of a nitrogen heterocyclic azo dye having the following formula:

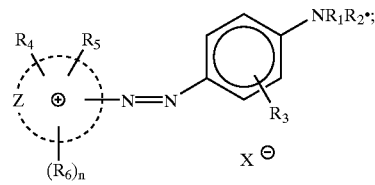

and

D) printing on an ink-receptive substrate using said ink jet ink in response to said digital data signals.

10 Claims, No Drawings

INK JET PRINTING METHOD

CROSS REFERENCE TO RELATED APPLICATIONS

Reference is made to commonly assigned, co-pending U.S. patent application Ser. Nos.:

09/643,798 by Chen et al., filed of even date herewith, entitled "Ink Jet Ink Composition";

09/643,281 by Shuttleworth et al., filed of even date herewith, entitled "Ink Jet Ink Composition";

09/643,789 by Chen et al., filed of even date herewith, entitled "Ink Jet Printing Method";

the disclosures of which are hereby incorporated by reference.

FIELD OF THE INVENTION

This invention relates to an ink jet printing method using an ink jet ink composition containing cationic dyes and a polymer latex.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in, drop-on-demand printing include piezoelectric transducers and thermal bubble formation. Ink jet printers have found broad applications across markets ranging from industrial labeling to short run printing to desktop document and pictorial imaging.

Commercial dye based inks are commonly composed of a chromophoric unit which has attached to it, by some means, an anionic functionality. The receiver material commonly possesses some kind of cationic functionality, so that the integrity of the image is maintained by means of a salt type link, between the dye and receiver material as described in EP 970819A2. Much less common is the reverse of this system where the dye is cationic and the receiver contains the anionic function as described in EP1010539A1. There are always limitations for the above two scenarios that the right dye-mordant combination has to be chosen in order to obtain high quality ink jet prints with good waterfastness and light fastness.

U.S. Pat. No. 5,560,996 discloses a variety of cationic dyes, including cationic azo dyes such as Basic Red 46 and other cationic magenta dyes such as Basic Reds 12, 14 and 15 for use in an ink jet ink. However, there is a problem with these dyes in that they have poor light stability.

It is an object of this invention to provide an ink jet printing method using an ink composition that is capable of yielding print images with consistent light fastness irrespective of the receiver type.

SUMMARY OF THE INVENTION

This and other objects are achieved in accordance with this invention which relates to an ink jet printing method, comprising the steps of:

A) providing an ink jet printer that is responsive to digital data signals;

B) loading the printer with ink-receptive elements comprising a support having thereon a porous ink-receptive layer;

C) loading the printer with an ink jet ink composition comprising water, a humectant, and a water-dispersible polymeric latex having contained therein a delocalized cationic azo dye derived from the quatemization of a nitrogen heterocyclic azo dye having the following formula:

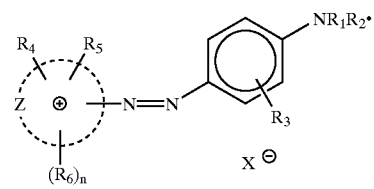

wherein:

Z represents the atoms necessary to complete a nitrogen-containing heterocyclic ring containing 2 or 3 nitrogen atoms and the balance carbon atoms;

$R_1$ and $R_2$ each independently represents hydrogen or a substituted or unsubstituted alkyl group of 1 to about 6 carbon atoms;

$R_4$, $R_5$ and $R_6$ each independently represents the same substituents as $R_1$ and $R_2$, halogen, cyano, substituted or unsubstituted alkoxy, acyl, benzoyl or alkoxycarbonyl; with the proviso that at least one of $R_4$, $R_5$ and $R_6$ represents a substituted or unsubstituted alkyl group of 1 to about 6 carbon atoms attached to a nitrogen atom;

$R_3$ represents the same groups as $R_4$, $R_5$ and $R_6$; hydroxy; a polyoxyalkylene group of 2–20 alkylene oxide residues; carboxy or sulfo or phospho ester; carbamoyl; substituted or unsubstituted alkyl-, aryl-aralkyl-, diaryl- or dialkyl-carbamoyl of 1 to about 20 carbon atoms; sulfamoyl; substituted or unsubstituted alkyl-, aryl-, aralkyl-, diaryl- or dialkyl-sulfamoyl of 1 to about 20 carbon atoms; acylamino; sulfonylamino; amino; a substituted or unsubstituted alkyl-, aryl-, aralkyl-, diaryl- or dialkylamino-of 1 to about 20 carbon atoms; or a quaternary ammonium or phosphonium group; or may be combined with $R_2$ to form a carbocyclic or heterocyclic 5 or 6 membered ring;

n is 1 except when Z represents the atoms necessary to complete a nitrogen-containing heterocyclic ring containing 3 nitrogen atoms, in which case n is 0; and X represents a counterion, such as citrate, gluconate or lactate; with the proviso that when Z represents the atoms necessary to complete a nitrogen-containing heterocyclic ring of 3 nitrogen atoms, then $R_3$ is combined with $R_2$ to form a carbocyclic or heterocyclic 5 or 6 membered ring; and D) printing on an ink-receptive substrate using the ink jet ink in response to the digital data signals.

It has been found that use of the above dyes provide excellent light stability for the printed image on a variety of different ink jet receivers when a water dispersible polymer latex is contained in the ink composition irrespective of the receiver type.

DETAILED DESCRIPTION OF THE INVENTION

Quaternized nitrogen heterocyclic-azo dyes are not new. They have been used for dyeing fabrics, particularly polyacrylonitrile fabrics. Typical examples are quatemized pyrazole-azo, imidazole-azo, triazole-azo dyes. Their use has been described for this purpose in "Chemistry and Application of Dyes" ed D. R. Waring and G. Hallas, (Plenum Press), p184. A typical preparation of dyes of this type is also described in the above reference (p197).

Representative examples of dyes employed in the invention are:

In a preferred embodiment of the invention, $R_1$ in the above formula represents hydrogen. In another preferred embodiment, $R_2$ represents $C_4H_9$. In still another preferred embodiment, $R_2$ and $R_3$ are taken together and represent a tetrahydroquinoline ring. In yet another preferred embodiment, $R_4$ represents CN or $CON(C_2H_4OH)_2$. In still another preferred embodiment, $R_5$ and $R_6$ each represents $CH_3$.

In general, the above dyes comprise from about 0.2 to about 5%, prferably from about 0.5 to 3%, by weight of the ink jet composition.

The cationic dyes employed in the present invention should be practically water insoluble, with the solubility in water preferably less than about 0.1 g/l at 25° C., and the solubility in organic solvents such as methanol, acetone, ethyl acetate and tetrahydrofuran greater than or equal to about 0.2 g/l. The solubility of cationic dyes in water and organic solvent is significantly affected by the nature of the counterion $X^-$. The counterions preferred for solubility are $BF_4^-$, $OTs^-$, $PF_6^-$, $C_{12}H_{25}SO_3^-$ and $ClO_4^-$.

The dye-containing polymeric latex employed in the invention can be prepared by dissolving the dye in a water-miscible organic solvent, mixing the solution with the latex and then removing the solvent. Useful water-miscible organic solvents are water-miscible alcohols, ketones and

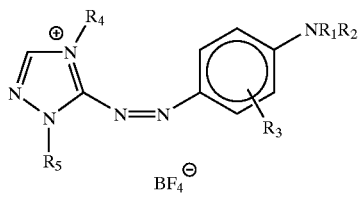

| Dye | $R_1$ | $R_2$-$R_3$ | $R_4$ | $R_5$ | λ-max (nm) |
|---|---|---|---|---|---|
| 1 | n-$C_4H_9$ | 2,2,4,7-Tetramethyl tetrahydroquinoline | $CH_3$ | $CH_3$ | 547 |
| 2 | —H | 2,2,4,7-Tetramethyl tetrahydroquinoline | $CH_3$ | $CH_3$ | 534 |
| 3 | n-$C_4H_9$ | 2,2,4,7-Tetramethyl tetrahydroquinoline | $C_2H_5$ | $C_2H_5$ | 549 |
| 4 | $C_2H_5$ | 2-Methyl-benzoxazine | $CH_3$ | $CH_3$ | 546 |
| 5 | $C_2H_4OH$ | 2,2,4-Trimethyl tetrahydroquinoline | $CH_3$ | $CH_3$ | 544 |

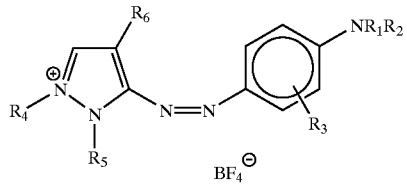

| Dye | $R_1$ | $R_2$ | $R_3$ | $R_4$ | $R_5$ | $R_6$ | λ max |
|---|---|---|---|---|---|---|---|
| 6 | n-$C_4H_9$ | 2,2,4,7-Tetramethyl tetrahydroquinoline | | $CH_3$ | $CH_3$ | $CONH(C_2H_4OH)_2$ | 551 |
| 7 | $C_2H_4Cl$ | 2,2,4,7-Tetramethyl tetrahydroquinoline | | $CH_3$ | $CH_3$ | $CO_2CH_3$ | 530 |
| 8 | $C_2H_5$ | 2,2,4-Trimethyl tetrahydroquinoline | | $CH_3$ | $CH_3$ | $CONHC_4H_9$ | 550 |
| 9 | $C_2H_5$ | $C_2H_5$ | H | $CH_3$ | $CH_3$ | CN | 550 |
| 10 | n-$C_4H_9$ | 2,2,4,7-Tetramethyl tetrahydroquinoline | | $CH_3$ | $CH_3$ | $CO_2CH_3$ | 546 |
| 11 | n-$C_3H_7$ | n-$C_3H_7$ | 3-$NHCOCH_3$ | $CH_3$ | $CH_3$ | $CO_2CH_3$ | 544 |
| 12 | $C_2H_5$ | $C_2H_5$ | 3-$CH_3$ | $CH_3$ | $CH_3$ | CN | 554 | amides, tetrahydrofuran, N-methyl-2-pyrrolidone, dimethylsulfoxide and mixtures thereof, such as acetone, ethyl alcohol, methyl alcohol, isopropyl alcohol, dimethylformamide, methyl-ethyl ketone etc.

The ink jet ink containing the water-dispersible polymeric latex employed in the invention consists of water as a continuous phase and dye-containing polymeric latex as a dispersed phase. In a preferred embodiment of the invention, the polymeric latex meets the following test: At 25° C., the polymeric latex must: (a) be capable of forming a stable dispersion with water at a concentration of from 0.2 to 50 percent by weight, preferably 1 to 20 percent by weight, and (b) when 100 ml of the latex is then mixed in an equal volume of the water-miscible organic solvent described above, stirred and allowed to stand for 10 minutes, exhibit no observable coagulation of the polymeric latex. In order to be useful in the ink, the latex should have an average particle size of <1 $\mu$m, preferably <0.5 $\mu$m.

Aqueous lattices can be prepared by free radical polymerization or by condensation polymerization. Emulsion polymerization is the preferred method of preparing polymer lattices. Monomers suitable to prepare the polymer lattices for this application include an acrylic acid, for example, acrylic acid, .alpha.-chloroacrylic acid, an .alpha.-alkylacrylic acid (such as methacrylic acid, etc.), etc., an ester or amide derived from an acrylic acid (for example, acrylamide, methacrylamide, n-butylacrylamide, t-butylacrylamide, diacetone acrylamide, methyl acrylate, ethyl acrylate, n-propyl acrylate, n-butyl acrylate, tert-butyl acrylate, isobutyl acrylate, 2-ethylhexyl acrylate, n-octyl acrylate, lauryl acrylate, tetrahydrofuryl acrylate, methyl methacrylate, ethyl methacrylate, n-butyl methacrylate, .beta.-hydroxy methacrylate, tetrahydrofuryl methacrylate, etc.), a vinyl ester (for example, vinyl acetate, vinyl propionate, vinyl laurate, etc.), acrylonitrile, methacrylonitrile, an aromatic vinyl compound (for example, styrene and a derivative thereof, vinyl toluene, divinyl benzene, vinyl acetophenone, sulfostyrene, etc.), itaconic acid, citraconic acid, crotonic acid, vinylidene chloride, a vinyl alkyl ether (for example, vinyl ethyl ether, etc.), an ester of maleic acid, N-vinyl-2-pyrrolidone, N-vinylpyridine, 2- or 4-vinylpyridine, etc. Of these monomers, an ester of acrylic acid, an ester of methacrylic acid, and styrene and styrene derivatives are particularly preferred. Two or more ethylenic unsaturated monomers can be used together. For example, a combination of methyl acrylate and butyl acrylate, ethyl acrylate and styrene , tetrahydrofuryl methacrylate and ethylacrylate, methyl acrylate and ethyl acrylate, etc., can be used.

The polymeric latex used in the invention can be prepared by emulsion polymerization or solution polymerization technique. Emulsion polymerization is preferred. Emulsion polymerization is well known in the art and is described, for example, in F. A. Bovey, Emulsion Polymerization, issued by Interscience Publishers Inc. New York, 1955. Examples of the chemical initiators which may be used include a thermally decomposable initiator, for example, a persulfate (such as ammonium persulfate, potassium persulfate, sodium persulfate), hydrogen peroxide, 4,4'-azobis(4-cyanovaleric acid), and redox initiators such as hydrogen peroxide-iron(II) salt, potassium persulfate-sodium hydrogensulfate, potassium persulfate-sodium metabisulfite, potassium persulfate-sodium hydrogen bisulfite, cerium salt-alcohol, etc. Emulsifiers which may be used in the emulsion polymerization include soap, a sulfonate(for example, sodium N-methyl-N-oleoyltaurate, sodium dodecylbenzene sulfonate alpha-olefin sulfonate, diphenyloxide disulfonate, naphthalene sulfonate, sulfosuccinates and sulfosuccinamates, polyether sulfonate, alkyl polyether sulfonate, alkylarylpolyether sulfonate, etc.), a sulfate (for example, sodium dodecyl sulfate), a phosphate (for example, nonylphenol ethoxylate phosphate, linear alcohol alkoxylate phosphate, alkylphenol ethoxylate phosphate, phenol ethoxylate), a cationic compound (for example, cetyl trimethylammonium bromide, hexadecyl trimethylammonium bromide, etc.), an amphoteric compound and a high molecular weight protective colloid (for example, polyvinyl alcohol, polyacrylic acid, gelatin, etc.).

A second class of polymeric lattices used in the invention may be an aqueous dispersible polyester such as Eastman AQ® polyesters produced by the Eastman Chemical Company. The three polyesters, Eastman AQ 29®, AQ 38®, and AQ 55® are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e., sulfoisophthalic acid, can control the particle size. The particle sizes range from 20 to 100 nm.

A third class of polymeric lattices used in the invention may be an aqueous dispersible polyurethane such as Witcobond® anionic and cationic polyurethane dispersion by Witco Corp. or Sancure® polyurethane by BF Goodrich Company.

In addition to the colorant, other ingredients are also commonly added to ink jet inks. Water miscible organic solvents humectants and/or co-solvents may be added to aqueous inks to help prevent the ink from drying out or crusting in the orifices of the printhead or to help the ink penetrate the receiving substrate, especially when the substrate is a highly sized paper. Examples of such solvents include glycols and derivatives thereof, including propylene glycol, polypropylene glycol, ethylene glycol, polyethylene glycol, diethylene glycol, glycerol, thiodiethanol, tetraethylene glycol (and mixtures and derivatives thereof), low molecular weight alcohols such as ethanol and isopropanol and amides such as N-methylpyrrolidone.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2, 6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition used in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of micro-organisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLE

Control Ink C-1(No Polymer Latex)

To prepare the comparative ink jet ink, 4.07 g of the aqueous stock solution (2.5% by weight) of water soluble dye Control 1(below), 0.075 g Surfynol® 465 (from Air Products), 0.9 g glycerol, 0.9 g diethylene glycol were added to 9.06 g distilled water. The final ink contained 0.68% dye, and 0.5% Surfynol® 465, 6% glycerol, 6% diethylene glycol. The solution was filtered through a 0.45 μm polytetrafluoroethylene filter and filled into a refillable ink jet cartridge.

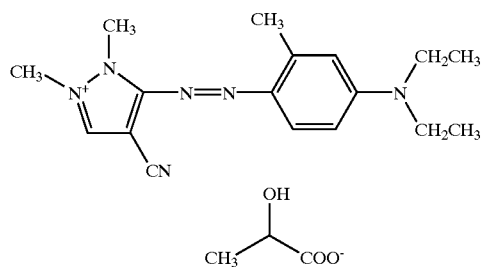

Control 1

Control Ink C-2 (No Polymer Latex)

This composition was prepared similar to C-1 except that 3.78 g of the aqueous stock solution (4% by weight) of water soluble dye Control 2 (below) was used instead of Control 1. The final ink contained 1.0% dye.

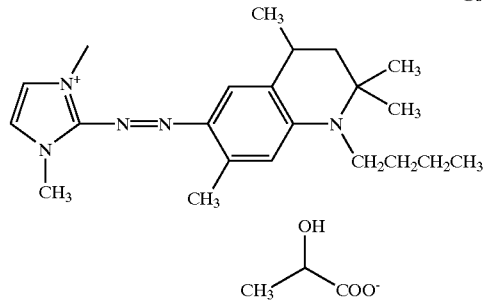

Control 2

Ink 1 (Contains Latex-Invention)

To 4.8 g of 31.2% comnnercially available latex dispersion AQ 55® (from Eastman Chemical Co.) was added 10.2 g of water and 15.0 g of methanol to form a diluted polymer dispersion. A solution of dye 1 (above) in methanol (300 mg in 25 ml of methanol) was added dropwise to the above AQ 55® dispersion with continuous stirring. After 1 hour, the organic solvent was removed under reduced pressure. The resulting stock solution was filtered through a 0.45 μm filter. The concentration of dye 1 in the latex stock solution was estimated to be 2.0%, and the polymer concentration was 10% by weight.

To prepare the ink solution, 7.5 g of the above latex solution, 0.075 g Surfynol® 465 (from Air Products), 0.9 g glycerol and 0.9 g diethylene glycol were added to 5.62 g distilled water.

Ink 2 (Contains Latex-Invention)

A composition similar to Ink 1 was prepared except that Dye 12 was used instead of Dye 1. To prepare the AQ 55® latex containing Dye 12, 210 mg of Dye 12 was dissolved in 20 ml of methanol.

Printing

The above prepared inks were filtered through a 0.45 μm polytetrafluoroethylene filter and placed in an ink cartridge and fitted into the black ink station of an Epson ® 200 Color Stylus II printer. A test image consisting of a series of 21 variable density patches, approximately 15 by 13 mm in size, ranging from 5% dot coverage to 100% dot coverage, was printed using the above inks onto commercially available ink jet receiver papers, including Hammermill Radiant White Plain Laser Paper (Catalog No. 00460-4), Kodak Photographic Quality Paper (Catalog No. 800 6298), a gelatin-based receiver, and Epson photo paper (Catalog No. S 041141), Konica QP Photo IJ Paper (Catalog No. KJP-LT-GH-15-QP PI), Mitsubishi Calcomp Glossy CJ paper (Catalog No. 8021601720), all of which are photographic quality porous receivers. The elements were allowed to dry for 24 hours at ambient temperature and humidity.

Stability Tests

The above step images were then subjected to light fade under 50 Klux high intensity daylight irradiation for a week. The Status A green reflection densities of maximum density patch of the said step images were measured using an X-Rite 820 ® densitometer before and after the fade test for light. The % Retained in Status A green density for the 100% dot coverage patches were calculated and listed in the following table:

TABLE

| Ink jet Receivers | % Retained at Dmax after Light Stability Test | | | |
|---|---|---|---|---|
| | Control Ink C-1 | Ink 1 | Control Ink C-2 | Ink 2 |
| Kodak Photographic Quality Paper | 79 | 93 | 78 | 97 |
| Epson Photo Paper | 14 | 81 | 69 | 90 |
| Konica QP Paper | 25 | 90 | 38 | 91 |
| Mitsubishi Paper | 45 | 92 | 66 | 91 |
| Hammermill Laser Paper | 40 | 88 | 39 | 86 |

The above results show that printed elements using the inks employed in the invention had improved light stability as compared to elements using the control inks.

The invention has been described in detail with particular reference to certain preferred embodiments thereof, but it will be understood that variations and modifications can be effected within the spirit and scope of the invention.

What is claimed is:

1. An ink jet printing method, comprising the steps of:
A) providing an ink jet printer that is responsive to digital data signals;
B) loading said printer with ink-receptive elements comprising a support having thereon a porous ink-receptive layer,
C) loading said printer with an ink jet ink composition comprising water, a humectant, and a water-dispersible polymeric latex having contained therein a practically water-insoluble delocalized cationic azo dye which has solubility in water less than about 0:1 g/l at 25° C. and solubility in organic solvents greater than or equal to about 0.2 g/l and is derived from the quaternization of a nitrogen heterocyclic azo dye wherein said delocalized cationic azo dye has the following formula:

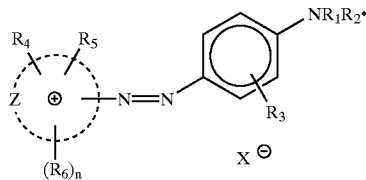

wherein:

Z represents the atoms necessary to complete a nitrogen-containing heterocyclic ring containing 2 or 3 nitrogen atoms and the balance carbon atoms;

$R_1$ and $R_2$ each independently represents hydrogen or a substituted or unsubstituted alkyl group of 1 to about 6 carbon atoms;

$R_4$, $R_5$ and $R_6$ each independently represents the same substituents as $R_1$ and $R_2$, halogen, cyano, substituted or unsubstituted alkoxy, acyl, benzoyl or alkoxycarbonyl; with the proviso that at least one of $R_4$, $R_5$ and $R_6$ represents a substituted or unsubstituted alkyl group of 1 to about 6 carbon atoms attached to a nitrogen atom;

$R_3$ represents the same groups as $R_4$, $R_5$ and $R_6$; hydroxy; a polyoxyalkylene group of 2–20 alkylene oxide residues; carboxy or sulfo or phospho ester, carbamoyl; substituted or unsubstituted alkyl-, arylaralkyl-, diaryl- or dialkyl-carbamoyl of 1 to about 20 carbon atoms; sulfamoyl; substituted or unsubstituted alkyl-, aryl-, aralkyl-, diaryl- or dialkyl-sulfamoyl of 1 to about 20 carbon atoms; acylamino; sulfonylamino; amino; a substituted or unisubstituted alkyl-, aryl-, aralkyl-, diaryl- or dialkylamino- of 1 to about 20 carbon atoms; or a quaternary ammonium or phosphonium group; or may be combined with $R_2$ to form a carbocyclic or heterocyclic 5 or 6 membered ring;

n is 1 except when Z represents the atoms necessary to complete a nitrogen-containing heterocyclic ring containing 3 nitrogen atoms, in which case n is 0; and X represents a counterion of $BF_4^-$, $OTs^-$, $PF_6^-$, $C_{12}H_{25}SO_3^-$ or $ClO_4^-$; with the proviso that when Z represents the atoms necessary to complete a nitrogen-containing heterocyclic ring of 3 nitrogen atoms, then $R_3$ is combined with $R_2$ to form a carbocyclic or heterocyclic 5 or 6 membered ring; and D) printing on an ink-receptive substrate using said ink jet ink in response to said digital data signals.

2. The method of claim 1 wherein $R_1$ in the above formula represents hydrogen.

3. The method of claim 1 wherein $R_2$ represents $C_4H_9$.

4. The method of claim 1 wherein $R_2$ and $R_3$ are taken together and represent a tetrahydroquinoline ring.

5. The method of claim 1 wherein $R_4$ represents CN.

6. The method of claim 1 wherein $R_5$ and $R_6$ each represents $CH_3$.

7. The method of claim 1 wherein $R_4$ represents $CON(C_2H_4OH)_2$.

8. The method of claim 1 wherein said humectant is diethylene glycol, glycerol or diethylene glycol monobutylether.

9. The method of claim 1 wherein said dye comprises about 0.2 to about 5% by weight of said ink jet ink composition.

10. The method of claim 1 wherein said water-dispersible polymeric latex comprises a polyester, a polyurethane or an acrylate.

* * * * *